United States Patent Office 3,634,230
Patented Jan. 11, 1972

3,634,230
PROCESS FOR REMOVAL OF INORGANIC AND ORGANIC MATTER FROM WASTE WATER SYSTEMS
James J. Odom, Jr., Thomas P. Shumaker, and Donald B. Griffin, Tuscaloosa, Ala., assignors to Reichhold Chemicals, Inc., White Plains, N.Y.
No Drawing. Filed Aug. 6, 1969, Ser. No. 848,071
Int. Cl. C02b 1/20
U.S. Cl. 210—52
12 Claims

ABSTRACT OF THE DISCLOSURE

A process and agents are provided for removal of both inorganic and organic contaminants from waste water systems. These systems are treated with a phenolic aldehyde resin solubilized by alkali to effect removal of uranium salts and other inorganic salts such as phosphates, chromates, inorganic pigments and the like; partially or wholly non-biodegradable detergents such as alkyl benzene sulfonates and linear alkyl sulfonates; and organic materials such as decayed plant life, other nitrogen-bearing substances, phenol and phenol derivatives, color-bearing matter, and the like.

This invention relates to the removal of inorganic and organic contaminants from water systems. More particularly, the invention relates to the purification of waste water systems by the treatment of such systems with improved agents for the removal of inorganic and organic materials.

By "waste" water systems is meant any influent or effluent water streams containing undesired inorganic or organic contaminants.

A large portion of the inorganic contaminants in waste water systems have their origin in widely used domestic detergents, such as phosphate and borate-containing detergents. Phosphates and borates are major constituents in many domestic and industrial detergents, and are, therefore, major contributors to pollution of waste water systems. These phosphates and borates are not biodegradable, and thus are not consumed by the bacteria normally present in soil and sewage.

Further, presently used waste water treatment processes are not normally effective for the removal of phosphates, borates and other inorganic contaminants. In addition to inorganic phosphate and borate detergents, the phosphates present in the fertilizer compositions, metal cleaning and boiler water treating compounds, and the like also find their way into effluent streams from industrial sources and further contribute to the inorganic contaminant content of such waste water streams.

Recent industrial use of chromate and molybdate salts has been on the increase due to the utility of these salts in metal plating processes, in cooling towers to prevent formation of algae, and in chemical and metallurgical industrial processes. These chromate and molybdate salts are also non-biodegradable and hence are not removed by conventional waste water treatment processes. They therefore further contribute to inorganic contamination of waste water systems.

The conventional processing of uranium compounds from naturally occurring uranium minerals such as pitchblende, uraninite, carnotite, and others is designed to obtain uranium compounds having very low solubility in water. These uranium compounds are not completely insoluble, however, and since large amounts of water are used in their processing, it is not surprising to find uranium compounds in industrial waste water systems.

In fact, the industrial processing of uranium has thus resulted in contamination of waste water streams with small but significant amounts of both soluble uranium compounds and ultra-fine particles of uranium.

An important step in the processing of uranium compounds is the conversion of naturally occurring common uranium minerals like pitchblende, uraninite, carnotite, and others into their respective soluble derivatives. These soluble derivatives are separated from the remainder of the raw ore and uranium is precipitated as an insoluble salt. This separation phase of the processing is frequently preceded by a roasting process. One of the methods employed in ore separation is the so-called alkaline leach.

To attain maximum effectiveness, the leaching operation, which is usually a carbonate leaching, is performed under carefully controlled conditions of carbonate concentration, temperature and pressure.

Recovery of the uranium compounds from the carbonate leach liquors is accomplished by one of two procedures. In the first procedure, the leach liquor is acidified to a low pH and boiled to remove carbon dioxide. The uranium salts are then precipitated by raising the pH to 7 or above with sodium hydroxide or ammonia.

In the second procedure, sodium hydroxide is added directly to the carbonate solution to raise the pH above 11, whereupon reasonably complete precipitation of uranium occurs. Where precipitation is effected by addition of sodium hydroxide, sodium polyuranate salts are obtained, while the use of ammonia as a precipitant results in the production of complex salts whose structure is not clearly defined.

The compounds obtained by either of these commonly used uranium processing procedures have a low solubility in water, but are partially soluble, thus raising waste water contamination problems. The presence of even small quantities of uranium compounds in water systems is most undesirable because of the high chemical toxicity of these compounds which manifests itself in kidney damage and in acute necrotic arterial lesions.

There are also compelling economic reasons for the recovery of residual quantities of uranium salts present in waste water systems, and particularly from waste water systems from uranium processing plants. Typical samples taken from the waste water exiting uranium processing operations have been found to contain approximately 0.4 gm. of uranium per liter of water.

Many organic contaminants occur naturally in waste water systems. They are, for example, humin, ulmin, urea derivatives, and generally speaking, nitrogen-bearing substances derived from decay products of plant life, animal excrements and the like. Other organic contaminants find their way into waste water streams from diverse industrial and domestic sources. For example, phenol and phenol derivatives are formed by bacterial degradation of organic matter, and are also used directly as important industrial and domestic disinfectants. Phenols from both sources eventually find their way into waste water systems.

Synthetic organic detergents are a primary source of organic contamination of streams and other water systems. In the past, the synthetic detergents generally used in both home and industrial cleaning were alkyl benzene sulfonates, such as tetrapropylbenzene sulfonate. While these compounds, known as "hard" detergents, have very efficient and desirable cleaning properties, their use has created substantial problems of water contamination and pollution.

This problem results from the fact that the bacteria normally present in soil and sewage do not consume these detergents. Such bacterial action had always been sufficient to achieve substantially complete degradation of the conventional fatty and soap products. The failure of bacterial action to consume these sulfonate detergents in the usual manner means that these detergents are not removed in sewage treatment plants and home septic tanks, and remain in ground water and the water returned to rivers and streams.

Although these detergents are not toxic to humans, their presence is highly undesirable in drinking or swimming water or the like, and there is some evidence that they are also harmful to aquatic life.

Previous attempts to solve the water pollution problem resulting from the use of alkly benzene sulfonate detergents have proceeded in two diverse directions. Many attempts have been made to devise procedures and equipment to effectively remove these non-biodegradable detergents from waste water systems. These procedures have largely utilized treating units to reduce the detergent level in discharge waste water from commercial laundries and other similar facilities which utilize large quantities of such detergents.

Additional attempts have been made, on a larger scale, by detergent manufacturers, governmental agencies, and industry as a whole to develop a satisfactory process for the removal of non-biodegradable detergents from water streams.

Another approach to this problem has been the attempt by the detergent industry to provide detergents which are biodegradable so that they can be removed from waste water streams by the same techniques that previously had been successful in the removal of fatty acid type soaps. The so-called "soft" detergents, which were recently developed as a result of this work, were originally believed to solve detergent water-pollution problems. These soft detergents are generally linear alkyl sulfonates, such as for example sodium dodecyl sulfonate.

Although linear alkyl sulfonates are biodegradable, it has been found that their biodegradability is largely dependent upon aerobic conditions or the presence of free oxygen, and that these soft detergents largely maintain their original form under anaerobic conditions or the absence of free oxygen. Thus, while linear alkyl sulfonate detergents can be effectively removed by conventional bacterial action in surface water, they are not effectively removed by bacterial action from streams discharged into the ground from cesspools, septic tanks and the like, where the water is not exposed to air. Hence, even these new soft detergents create a considerably ground-water pollution problem.

Some of the aforementioned water contaminants impart color to waste water streams. These color-bearing bodies may be of either inorganic or organic nature, and are difficult to eliminate from waste water streams by conventional filtration or sedimentation procedures. Other of the contaminants referred to above cause a foaming in waste water systems and are therefore also desirably removed from these systems.

Still other contaminants include turbidity producing materials, for example, colloidal particles derived from lower plant life, microorganisms, pigments, inorganic fibrous material, finely dispersed soil, clay and other like finely dispersed solids.

Many attempts have been made to solve the problem of contaminant removal from waste water systems. Procedures involving coagulation, filtration, ion exchange treatment and other complex and expensive procedures have been tried. A continuing search goes on for new and improved systems for dealing with the water pollution problem caused by such contaminants.

It is therefore a primary object of this invention to provide a new and improved process for the removal of inorganic and organic contaminants from waste water systems.

Another object of this invention is to provide improved agents for the removal of inorganic and organic contaminants from waste water systems.

A still further object of one embodiment of this invention is to provide a new and improved process for the removal of detergents from water systems.

Yet another object of one embodiment of this invention is to provide improved agents for the removal of detergents from water systems.

A further object of one embodiment of this invention is to provide a new and improved process for the removal of both alkyl benzene sulfonate (hard) detergents and linear alkyl sulfonate (soft) detergents from waste water systems.

Yet another object of this invention is to provide a new and improved process for the removal of inorganic and organic matter, including detergents, from waste water systems which can be effectively used to purify effluent waste streams, such as individual home sewage systems or industrial waste streams, as well as influent streams to industrial water treatment systems and to municipal water treatment plants and the like.

A further object of one embodiment of this invention is to provide an improved process for the removal of uranium salts from industrial uranium waste water systems.

A still further object of one embodiment of this invention is to provide new and improved agents for the removal of uranium salts from industrial uranium waste water systems.

Additional and further objects and advantages of this invention will be set forth in part in the description that follows, and in part will be obvious therefrom or may be learned by practice of this invention, such objects being realized and attained by means of the steps, methods, compositions, combinations and improvements pointed out in the appended claims.

To achieve the foregoing objects and in accordance with its purpose as embodied and broadly described, the process of this invention comprises treating waste water streams containing organic and inorganic impurities with an anionic alkali solubilized phenol-aldehyde condensation product. This alkali solubilized phenol-aldehyde condensation product is converted into an insoluble state which manifests itself by the formation of flocs in the system being treated. These flocs adsorb and/or absorb physically dissolved compounds, in much the same manner as activated charcoal.

Moreover, during the conversion of the alkali solubilized phenolaldehyde resins to their insoluble form, and subsequently during the floc formation, a medium is provided to coalesce and coagulate or conglomerate finely suspended solids present in the system and lump these finely suspended solids into clumps, thus allowing more effective filtration of the impurities from the system.

The combined contaminant-phenol-aldehyde conglomerate can be readily removed from the treated waste water systems by conventional classification means, such as filtration, settling, decantation and the like.

In accordance with one embodiment of this invention the present process comprises treating detergent-containing water streams with an alkali-solubilized anionic phenol-aldehyde condensation product. The phenol-aldehyde resinous removal agents are acidified by addition of a mineral acid, and react with both alkyl benzene sulfonate and linear alkyl sulfonate detergents present in such water systems to produce an insoluble reaction product, namely, an adsorbate, absorbate, conglomerate, or precipitate, which can be removed from the waste streams by the conventional means described above.

Finely dispersed organic and inorganic solids in the waste water streams are converted into larger lumps through the action of the removal agent of this invention, upon acidification, in much the same manner that pigments are flocculated. The exact mechanism of this phenomenon is not known, but it is believed that freshly precipitated particles react as absorbants and/or adsorbants by a mechanism similar to the action of activated charcoal.

This flocculation causes rapid settling or sedimentation of the undesired organic or inorganic solid contaminants and allows easy removal of such flocs by conventional filtration procedures. Particles of neutral nature are caught up in this process of agglomeration and caused to settle out along with the flocculated particles.

The flocculent material formed by the reaction of the treatment agents of this invention with the contaminants present in the waste water systems normally settles or precipitates out of the systems. Because of their colloidal character, these reaction products tend to cause other solids in the system to settle along with them. Thus the process of this invention is advantageous in reducing ionic and nionionic solid content of the waste water system. This action, of course, greatly enhances the overall purification efficiency of the process of this invention.

The contaminant removal agents utilized in the process of this invention are alkali soluble, readily water-dispersible liquid resins. Thus, these agents can be added to waste water systems in alkaline solution. Of course, these resins are generally also soluble in common organic solvents such as methanol, ethanol, isopropanol, ethylene glycol, and the like, and can be added to the waste water systems in solution in such solvents, if desired, in the presence of an alkali. The resins are generally insoluble in aliphatic or aromatic hydrocarbons.

Without being limited to any particular theory, it is believed that the present process for the removal of inorganic and organic substances from waste water systems is based primarily on a physical absorption of soluble as well as finely dispersed contaminant particles onto the large surface areas of the particles of alkalized phenol-aldehyde resin present in the acidified waste water system.

In accordance with one embodiment of this invention dissolved uranium residue present in waste water systems is reacted with alkalized phenol-aldehyde resins at a pH of about 9 to 11, and preferably about 10 to form an insoluble reaction product. Thus, it has been found that when a small amount of alkali-solubilized phenol-formaldehyde resin is added to a stream of waste water containing soluble and/or finely dispersed ammoniacal uranium residues at a pH of about 10, a precipitate is formed. This precipitate can be removed from the waste water system by conventional classification procedures and its uranium values recovered. No acidification step is necessary in the removal of uranium residues from waste water systems in accordance with this embodiment of the present invention. Soluble and/or finely dispersed ammonical uranium residues thus have been unexpectedly found to form insoluble adsorbates and/or absorbates with the resinous removal agents of this invention at a pH of about 10.

Exemplary of the preferred phenol-aldehyde resinous removal agents of this invention are phenol-formaldehyde condensation products.

In general, these condensation products are prepared by reacting one mole of phenol with one or more moles of aldehyde. The preferred phenol-aldehyde ratios are from slightly less than 1:1 to about 1:2.5 The reaction is carried out in presence of a basic catalyst, such as sodium hydroxide, calcium hydroxide, barium hydroxide and the like. The caustic level can vary widely. The addition of enough sodium hydroxide to obtain a solution containing about 10% sodium hydroxide is preferred. This level of alkali solubilizes the reaction product and makes it directly usable in the waste water treatment process of this invention.

In accordance with the invention, a variety of phenolic compounds are suitable for use in preparation of the resinous removal agents. Suitable phenolic compounds include monohydric phenols having two (2) hydrogens reactive with aldehydes. Specifically, phenol, ortho cresol, para cresol, 3,5-dimethylphenol, 2,5-dimethylphenol, ortho ethylphenol, para ethylphenol, ortho isopropylphenol, para isopropylphenol, ortho propylphenol, para propylphenol, ortho butylphenol, para butylphenol, ortho phenylphenol, monohaloparaphenol, monohaloorthophenol, and the like are satisfactory phenolic reactants. Phenol itself is preferred because of the outstanding properties of the removal agents achieved therefrom.

Care should be exercised in controlling the ratio of phenol to aldehyde used in preparing the removal agents of this invention, to prevent separation of phenolic bodies into the aqueous phase. In all cases, the mole ratio of phenol to aldehyde should be less than 1:1.

Suitable aldehydes for use in preparing the removal agents of this invention include aldehydes of the formula

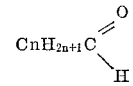

wherein $n$ is an integer between 0 and 10, formaldehyde, para formaldehyde, acetaldehyde, propionaldehyde, butyraldehyde, valeraldehyde, hexaldehyde, heptaldehyde, and/or their solutions in water or the like. Formaldehyde is preferred.

The removal agents of this invention should be added to the waste water system being treated in the form of an alkaline solution which can be either diluted or concentrated. It is preferred to add the removal agent dissolved in a 10% solution of sodium hydroxide.

The waste water system should be acidified to a pH below 7, preferably prior to treatment with the removal agents, for removal of contaminants other than uranium residues. When uranium contaminants are to be removed, the pH of the solution must be about 10 for the precipitation reaction to occur. No acidification step is thus used in such uranium removal processes.

The amount of resinous removal agent added to the waste water system being treated can vary widely, depending on the treatment system in which the resin is used, i.e., whether it is a primary or secondary treatment system; the amount of waste water to be treated; the permissible dwell time in the treatment system; and the degree of contaminant removal desired in the system. Thus the amount of removal agents employed may range from about 0.005% to about 0.1% by weight of the effluent.

It has been found that the settling rate of the colloidal precipitate formed between the resinous removal agents of this invention and the organic or inorganic contaminants, such as detergents, present in the waste water systems can be increased by the additional use of acidic alum solutions, and while the use of such alum solutions is not required, it is preferred. If alum is used, it is normally added to the system in a dilute aqueous solution.

The addition of alum is not desirable in removal of uranium residues from waste water systems. The removal of uranium residues from the waste water also requires the addition of larger amounts of the resinous removal agents of this invention to be totally effective. Effective treating levels are in the range of 2 to 10 parts of resinous removal agent per part of uranium present in the system.

To illustrate the present invention more specifically, reference is now made to the specific examples that follow. These examples are non-limiting and illustrate the preparation of certain of the resinous contaminant-removal agents of this invention, and the treatment of various waste water systems with these agents in accordance with the process of this invention.

Whenever the term "parts" or "percent(%)" is used in this specification or in the appended claims, it is intended to mean parts or percent by weight, unless otherwise specifically indicated.

EXAMPLE 1

Preparation of a phenol-formaldehyde condensation product

A clean kettle is charged with 150 lbs. of water, 15 lbs. of methanol and 150 lbs of phenol. The kettle is cooled with water to prevent heat exotherm during the addition of 200 lbs. of 44% formaldehyde. Then 85 lbs. of 50% caustic sodium hydroxide solution are added to the reaction vessel. The addition is controlled to prevent the temperature of the reaction mixture from rising above 50° C. After all the caustic soda is added, temperature is allowed to rise to 96° C., and held there until the mixture reaches an extrapolated viscosity of F–G (Gardner).

Thereafter the batch is cooled rapidly to 20–25° C. The reaction product exhibits the following properties:

Non-volatiles—40–42%
Specific gravity—1.17–1.19
Viscosity—D–M (Gardner)
pH—10.5–12.5
Free formaldehyde—0.5% max.

EXAMPLE 2

Removal of suspended solids and BOD (Biological oxygen demand) from textile effluents An industrial effluent from textile finishing processes had the following characteristics prior to treatment:

Biological oxygen demand (BOD) (5 days)—240 p.p.m.
pH 6.5
Color (APHS)—2400
Suspended solids—310 p.p.m.

500 ml. of the effluent was adjusted to a pH of 4.5 with sulfuric acid. To this sample was added 500 p.p.m. of the resin of Example 1. An immediate development of floc was noted, part of the floc floated to the top and part settled to the bottom during the first 15 minutes. On standing for two hours the floc all settled to the bottom leaving a slight purple cast supernatant liquid.

The supernatant liquid had the following characteristics:

BOD (5 days)—55 p.p.m.
pH 4.4
Color (APHS)—400
Suspended solids—48

EXAMPLE 3

Removal of soluble contaminant 4 ml. of 1000 p.p.m. solution of U.C. P-Phenol were diluted to 240 ml. with tap water to give a 16 p.p.m. solution. 4.0 ml. of a 1000 p.p.m. solution of the resin of Example 1 were added and mixed. The pH was adjusted to slightly below 7 by addition of 1 ml. of a 5% alum solution. Floc formation was observed. After two hours of settling, a sample of the clear supernatant liquid was pipetted from the top of the cylinder for analysis. The analysis was 6.2 p.p.m. phenol—a 61% removal of the original phenol.

EXAMPLE 4

Removal of alkyl benzene sulfonate

A 50 p.p.m. solution of alkyl benzene sulfonate is treated with a 100 p.p.m. solution of the resin of Example 1. The pH was adjusted to slightly below 7 by addition of 100 p.p.m. of alum. A floc was formed and subsequently allowed to separate. The clear liquid was tested and found to contain 15 p.p.m. of alkyl benzene sulfonate, a removal of 70% of the original sulfonate.

EXAMPLE 5

Removal of color and suspended solids from textile effluents

A textile effluent had a black color of 2400 (Public Health Standard Transmission), suspended solids of 310 p.p.m., and a methylene blue active substance content of 8 p.p.m. The pH of this effluent was adjusted to 4.5 with sulfuric acid. To 1000 ml. of the effluent, 50 ml. of a 1% solution of the resin of Example 1 was added and agitated vigorously. After a one-hour settling period, the supernatant resin liquid was tested and found to contain 70 p.p.m. of suspended solids and to have a color of 300 (Public Health Standard Transmission). To obtain an equivalent result with alum, 100 ml. of a 1% solution was required.

EXAMPLE 6

Removal of pigments

The lead chromate reaction product of 125 ml. of a 1% potassium dichromate solution with 1.5 ml. of 1% lead acetate trihydrate was acidified with acetic acid to a pH of 4.5 and treated with 1.5 ml. of a 1% solution of the resin of Example 1. Large flocs immediately formed in the solution and rapid settling of these flocs was noted. An identical, untreated control sample remained an opaque yellow color containing suspended lead chromate particles for over 24 hours before settling to a very fine, hard-to-filter precipitate. The large floc obtained by treatment with the resin of Example 1 was readily and easily filtered.

EXAMPLE 7

An industrial, ammoniacal uranium waste effluent having a pH of 10 and a uranium content of 0.4 gm. per liter (expressed as uranium ion and determined by the method described in Scott's Standard Methods of Analysis, Fifth edition, vol. 1, pp. 1017–1022) was treated with a solution of 0.8 gm. per liter of the resin of Example 1. A flocculate precipitate was formed almost immediately. The effluent was subsequently filtered through a normal plate and frame filter press. The uranium content of the effluent was reduced to 0.02 gm. per liter.

What is claimed is:

1. A process for the removal of inorganic and organic contaminants selected from the group consisting of synthetic organic detergents, phosphate salts, borate salts, chromate salts, molybdate salts, phenols, substituted phenols, humin, lumin, urea, derivatives, nitrogen-bearing products of plant decay, animal excrements and degradation products of said excrements, colloidal particles from lower plant life, microorganisms, pigments, inorganic fibrous materials, and finely dispersed soil and clay, from waste water systems which comprises:

(A) contacting a waste water system containing at least one of said contaminants with a solution of a resinous removal agent;
  (1) the solution containing sufficient alkali to solubilize the resinous removal agent;
  (2) the resinous removal agent comprising a condensation product of the reaction of (a) a monohydric phenol having two hydrogens reactive to aldehyde with (b) a molar excess of an aldehyde having the formula

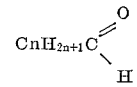

wherein $n$ is an integer between 0 and 10 and wherein said condensation reaction is carried out in the presence of an alkaline catalyst; and
  (3) the waste water system being contacted with said resinous removal agent at a pH less than 7; thereby converting the alkali-solubilized phenol-aldehyde resin to an insoluble, floc form within said waste water system and causing the formation of contaminant-phenol-aldehyde conglomerates in said system; and (B) removing the contaminant-phenol-aldehyde conglomerates from the waste water system.

2. The process of claim 1, wherein the removal agent is the reaction product of phenol and formaldehyde.

3. The process of claim 2, wherein the ratio of phenol to formaldehyde in said reaction product is from slightly less than 1:1 to about 1:2.5.

4. The process of claim 3, in which the waste water is acidified to a pH below 7.0 prior to the addition of the removal agent.

5. The process of claim 2, in which alum is added to the waste water system to increase the rate of contaminant removal.

6. The process of claim 1, wherein the contaminant to be removed from the system includes at least one inorganic material selected from the group consisting of phosphate, chromate, molybdate, and borate salts.

7. The process of claim 1, wherein the contaminant to be removed from the system includes at least one organic material selected from the group consisting of animal excrements, degradation products of said excrements, phenols, and substituted phenols.

8. The process of claim 1, in which the contaminant to be removed from the system includes an organic detergent.

9. The process of claim 8, in which the contaminant to be removed from the system includes a sulfonate detergent selected from the group consisting of alkyl benzene sulfonates and linear alkyl sulfonates.

10. A process for the removal of soluble or insoluble ammoniacal uranium residues from waste water systems, which comprises contacting a waste water system containing said ammoniacal uranium residues at a pH of about 9 to 11 with a solution of a resinuous removal agent containing sufficient alkali to solubilize the resinous removal agent; the resinous removal agent comprising a condensation product of the reaction of (a) a monohydric phenol having two hydrogens reactive to aldehyde with (b) a molar excess of an aldehyde having the formula

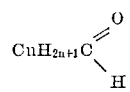

wherein $n$ is an integer between 0 and 10 and wherein said condensation reaction is carried out in the presence of an alkaline catalyst; thereby converting the alkali-solubilized phenol-aldehyde resin to an insoluble, floc form within said waste water system and causing the formation of a precipitate including phenol-aldehyde flocs and uranium; and separating the uranium-phenol-aldehyde precipitate from the waste water system.

11. The process of claim 10, wherein the treatment of the uranium-containing system is carried out at a pH of about 10.0.

12. The process of claim 11, wherein about 1 to 10 parts of said removal agent are added to the waste system for each part of uranium present therein.

References Cited
UNITED STATES PATENTS

| | | | |
|---|---|---|---|
| 2,341,907 | 2/1944 | Cheetham et al. | 210—37 |
| 2,780,514 | 2/1957 | Lutz | 210—32 X |
| 2,804,418 | 8/1957 | King | 162—165 X |
| 2,911,363 | 11/1959 | Kissling | 210—32 X |
| 3,142,638 | 7/1964 | Blaisdell et al. | 210—54 X |
| 3,123,553 | 3/1964 | Abrams | 210—37 X |
| 3,300,406 | 1/1967 | Pollio | 210—54 X |
| 3,306,714 | 2/1967 | Goren | 210—54 X |

MICHAEL ROGERS, Primary Examiner

U.S. Cl. X.R.

210—54; 260—29.3; 492.1; 252—301.1; 23—333

UNITED STATES PATENT OFFICE
CERTIFICATE OF CORRECTION

Patent No. 3,634,230          Dated    January 11, 1972

Inventor(s) JAMES J. ODOM, JR., ET AL

It is certified that error appears in the above-identified patent and that said Letters Patent are hereby corrected as shown below:

Claim 1, column 8, line 38, change "lumin" to -- ulmin --.

Claim 12, column 10, line 16, change "1" to -- 2 --.

Signed and sealed this 30th day of May 1972.

(SEAL)
Attest:

EDWARD M. FLETCHER, JR.
Attesting Officer

ROBERT GOTTSCHALK
Commissioner of Patents